(12) United States Patent
Challener et al.

(10) Patent No.: US 7,266,268 B2
(45) Date of Patent: Sep. 4, 2007

(54) DIFFRACTION GRATING

(75) Inventors: William A. Challener, Sewickley, PA (US); Edward C. Gage, Mars, PA (US); Tim Rausch, Gibsonia, PA (US); Christophe Mihalcea, Pittsburgh, PA (US); Keith Mountfield, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 367 days.

(21) Appl. No.: 11/032,277

(22) Filed: Jan. 10, 2005

(65) Prior Publication Data

US 2005/0135008 A1    Jun. 23, 2005

Related U.S. Application Data

(63) Continuation-in-part of application No. 10/655,994, filed on Sep. 5, 2003, now Pat. No. 7,155,732.

(51) Int. Cl.
G02B 6/34    (2006.01)

(52) U.S. Cl. .................... 385/37; 385/14; 385/129; 385/130

(58) Field of Classification Search ................ 385/129, 385/130, 131, 132, 14, 37
See application file for complete search history.

(56) References Cited

U.S. PATENT DOCUMENTS

| | | | |
|---|---|---|---|
| 4,945,525 A * | 7/1990 | Yamamoto et al. ...... 369/44.12 |
| 5,121,371 A * | 6/1992 | Farnsworth et al. ..... 369/44.26 |
| 5,391,865 A * | 2/1995 | Kurata et al. ............ 250/201.5 |
| 5,471,548 A * | 11/1995 | Brazas ........................ 385/37 |
| 5,475,670 A * | 12/1995 | Hamada et al. ........ 369/112.07 |
| 5,621,715 A * | 4/1997 | Ohyama ................. 369/112.12 |
| 5,629,917 A * | 5/1997 | Kamatani .............. 369/112.12 |
| 5,740,292 A | 4/1998 | Strasser ........................ 385/37 |
| 5,818,986 A | 10/1998 | Asawa et al. ................. 385/24 |
| 5,832,156 A | 11/1998 | Strasser et al. ............... 385/48 |
| 6,069,985 A | 5/2000 | Albin et al. ................... 385/12 |
| 6,122,299 A | 9/2000 | DeMars et al. ............... 372/20 |
| 6,285,813 B1 | 9/2001 | Schultz et al. ................ 385/37 |
| 6,421,481 B1 | 7/2002 | Sappey ........................ 385/37 |
| 6,427,041 B1 | 7/2002 | Strasser et al. ............... 385/37 |
| 2004/0001394 A1 | 1/2004 | Challener et al. ........ 369/13.32 |
| 2004/0001420 A1 | 1/2004 | Challener .............. 369/112.27 |
| 2004/0062503 A1 | 4/2004 | Challener ................... 385/129 |

* cited by examiner

*Primary Examiner*—Brian M. Healy
(74) *Attorney, Agent, or Firm*—Benjamin T. Queen, II; Robert P. Lenart, Esq.; Pietragallo Bosick & Gordon, LLP

(57) ABSTRACT

Diffraction gratings for coupling an electromagnetic wave into a planar waveguide are disclosed. The diffraction grating may include a first diffraction grating and a second diffraction grating slanted relative to one another. Alternatively, the diffraction grating may include a first diffraction grating and a second diffraction grating spaced apart to form a gap therebetween.

16 Claims, 6 Drawing Sheets

DIFFRACTION GRATING

CROSS REFERENCE TO RELATED APPLICATION

This application is a continuation-in-part application of U.S. patent application Ser. No. 10/655,994 filed on Sep. 5, 2003, now U.S. Pat. No. 7,155,732, the contents of which are hereby incorporated by reference.

STATEMENT REGARDING FEDERALLY SPONSORED RESEARCH OR DEVELOPMENT

This invention was made with United States Government support under Agreement No. 70NANB1H3056 awarded by the National Institute of Standards and Technology (NIST). The United States Government has certain rights in the invention.

FIELD OF THE INVENTION

The invention relates generally to diffraction gratings and, more particularly, to diffraction gratings for coupling an electromagnetic wave into a planar waveguide.

BACKGROUND OF THE INVENTION

In an effort to increase a real density of magnetic storage media, it is desirable to reduce the volume of magnetic material used to store bits of information in magnetic storage media. Superparamagnetic instabilities become an issue as the grain volume is reduced. The superparamagnetic effect is most evident when the grain volume V is sufficiently small that the inequality $K_u V/k_B T > 70$ can no longer be maintained. $K_u$ is the material's magnetic crystalline anisotropy energy density, $k_B$ is Boltzmann's constant, and T is the absolute temperature. When this inequality is not satisfied, thermal energy demagnetizes the stored bits. Therefore, as the grain size is decreased in order to increase the a real density, a threshold is reached for a given material $K_u$ and temperature T such that stable data storage is no longer feasible.

The thermal stability can be improved by employing a recording medium made of a material with a very high $K_u$. However, with the available materials current recording heads are not able to provide a sufficient or high enough magnetic writing field to write on such a medium. Accordingly, it has been proposed to overcome the recording head field limitations by employing thermal energy to heat a local area on the recording medium before or at about the time of applying the magnetic write field to the medium. By heating the medium, the $K_u$ or the coercivity is reduced such that the magnetic write field is sufficient to write to the medium. Once the medium cools to ambient temperature, the medium has a sufficiently high value of coercivity to assure thermal stability of the recorded information.

Heat assisted magnetic recording allows for the use of small grain media, which is desirable for recording at increased a real densities, with a larger magnetic anisotropy at room temperature to assure sufficient thermal stability. Heat assisted magnetic recording can be applied to any type of magnetic storage media, including tilted media, longitudinal media, perpendicular media and patterned media.

For heat assisted magnetic recording, an electromagnetic wave of, for example, visible, infrared or ultraviolet light can be directed onto a surface of a data storage medium to raise the temperature of the localized area of the medium to facilitate switching of the magnetization of the area. Well-known solid immersion lenses (SILs) have been proposed for use in reducing the size of a spot on the medium that is subjected to the electromagnetic radiation. In addition, solid immersion mirrors (SIMs) have been proposed to reduce the spot size. SILs and SIMs may be either three-dimensional or two-dimensional. In the latter case they correspond to mode index lenses or mirrors in planar waveguides. A metal pin can be inserted at the focus of a SIM to guide a confined beam of light out of the SIM to the surface of the recording medium. Commonly assigned U.S. Pat. No. 6,795,630 which is hereby incorporated by reference, discloses several waveguides having a metallic pin transducer for concentrating optical energy into a small spot.

For the design of an integrated heat assisted magnetic recording (HAMR) transducer, it has long been known that co-location of the near field optical source and the magnetic write field is required. Current designs for the integrated HAMR head rely on a perpendicular magnetic writer which requires a soft underlayer. Since HAMR requires a special media to enhance the coupling efficiency of the optical transducer and to control the thermal properties, it is highly desirable to remove the additional constraint of having a soft underlayer in the recording medium.

Thus there is a need for a HAMR head that can provide perpendicular magnetic writing to a storage medium that does not require a soft underlayer.

Data storage systems often incorporate optical components to assist in the recording of information. Such systems may include, for example, optical recording systems, magneto-optical recording systems or other thermal or heat assisted type recording systems, as described herein. An important aspect of such systems utilizing optical components may include the ability to generate small and intense optical spots of energy. The optical spots can be used for various functions in the recording process, such as aiding in the reading or writing of bits of information.

Prior to generating the small and intense optical spots of energy, it is usually necessary to couple an electromagnetic wave from an energy source into a desired optical condenser, such as a waveguide. One known structure for coupling the electromagnetic wave into the optical condenser is a diffraction grating. Diffraction gratings are generally known components in an optical system and may include, for example, a ray of fine, parallel, equally spaced reflecting or transmitting lines or grooves that mutually enhance the effects of diffraction to concentrate the diffracted electromagnetic wave in specific directions determined by the spacing of the lines and by the wavelength of the electromagnetic wave.

There is an increased emphasis on improving the a real densities of data storage systems. Thus, all components of a data storage system are being improved to achieve higher a real densities. For example, those systems that incorporate optical components to assist in the recording of information are in need of the ability to generate even smaller and more intense optical spots of energy to support the data storage systems of the future. In addition, new and improved diffraction gratings are desirable to more efficiently couple an electromagnetic wave into an optical condenser so that the even smaller and more intense optical spots can be generated as needed.

Accordingly, there is identified a need for an improved diffraction grating that overcomes limitations, disadvantages, and/or shortcomings of known diffraction gratings.

SUMMARY OF THE INVENTION

A magnetic recording head comprises a write pole having a pole tip adjacent to an air bearing surface, a return pole, a near field transducer positioned adjacent to the air bearing surface for producing near field radiation for heating a portion of a magnetic storage medium, and wherein a thermal profile of the portion of the magnetic storage medium has a maximum gradient at a location subject to a magnetic write field produced by the write pole. Various near field transducers can be used, including a metallic pin or a ridge waveguide.

If the near field transducer is a metallic pin, a waveguide can be used for coupling an electromagnetic wave to the near field transducer, wherein the metallic pin is positioned at a focal point of the waveguide. The magnetic recording head can further comprise means for electrically insulating the metallic pin from the write pole.

The invention also encompasses a disc drive comprising means for rotating a storage medium; and means for positioning a recording head adjacent to a surface of the storage medium; wherein the recording head includes a write pole having a pole tip adjacent to an air bearing surface, a return pole, a near field transducer positioned adjacent to the air bearing surface, for producing near field radiation for heating a portion of a magnetic storage medium, and wherein a thermal profile of the portion of the magnetic storage medium has a maximum gradient at a location subject to a magnetic write field produced by the write pole.

In another aspect, the invention provides a method of magnetic recording comprising: positioning an air bearing surface of a magnetic recording head adjacent to a magnetic storage medium, wherein the recording head includes a write pole having a pole tip adjacent to an air bearing surface, a return pole, a near field transducer positioned adjacent to the air bearing surface; using near field radiation produced at the near field transducer to heat a portion of the magnetic storage medium, wherein a thermal profile of the portion of the magnetic storage medium has a maximum gradient at a location subject to a magnetic write field produced by the write pole; and using a magnetic field produced by the write pole to affect the magnetization of the portion of the magnetic storage medium.

The thermal profile produced in the magnetic storage medium by the near field radiation can have a maximum gradient below an edge of the write pole.

An aspect of the present invention is to provide an apparatus including means for receiving an electromagnetic wave and a planar waveguide. The means for receiving an electromagnetic wave is positioned or shaped in relation to the planar waveguide so as to direct the electromagnetic wave and define a dead zone or dead spot area of the planar waveguide. The means for receiving an electromagnetic wave may include a first diffraction grating and a second diffraction grating. In addition, the first diffraction grating and the second diffraction grating may be spaced apart to form a gap therebetween. Alternatively, the first diffraction grating and the second diffraction grating may be slanted relative to each other.

Another aspect of the present invention is to provide an apparatus including a first diffraction grating for receiving a first electromagnetic wave and a second diffraction grating for receiving a second electromagnetic wave. The first diffraction grating and the second diffraction grating are spaced apart to form a gap therebetween. In addition, the apparatus may include a planar waveguide structured and arranged in relation to the first diffraction grating and the second diffraction grating for directing the first electromagnetic wave and the second electromagnetic wave, respectively, to a predetermined point.

Another aspect of the present invention is to provide an apparatus including a first diffraction grating for receiving a first electromagnetic wave and a second diffraction grating for receiving a second electromagnetic wave. The first diffraction grating and the second diffraction grating are slanted relative to each other. The apparatus may also include means for directing the first and second electromagnetic waves to a predetermined point, wherein the means for directing the electromagnetic wave is structured and arranged as a function of a positioning of at least one of the first diffraction grating and the second diffraction grating.

These and other aspects of the present invention will be more apparent from the following description.

DETAILED DESCRIPTION OF THE INVENTION

This invention encompasses devices that can be used to produce small optical spots and that can be used in magnetic and/or optical recording heads for use with magnetic and/or optical recording media. However, it will be appreciated that the invention may have utility in other technologies such as, for example, high resolution optical microscopy, lithography, integrated opto-electronic devices for telecommunications or other applications.

Figure 1:
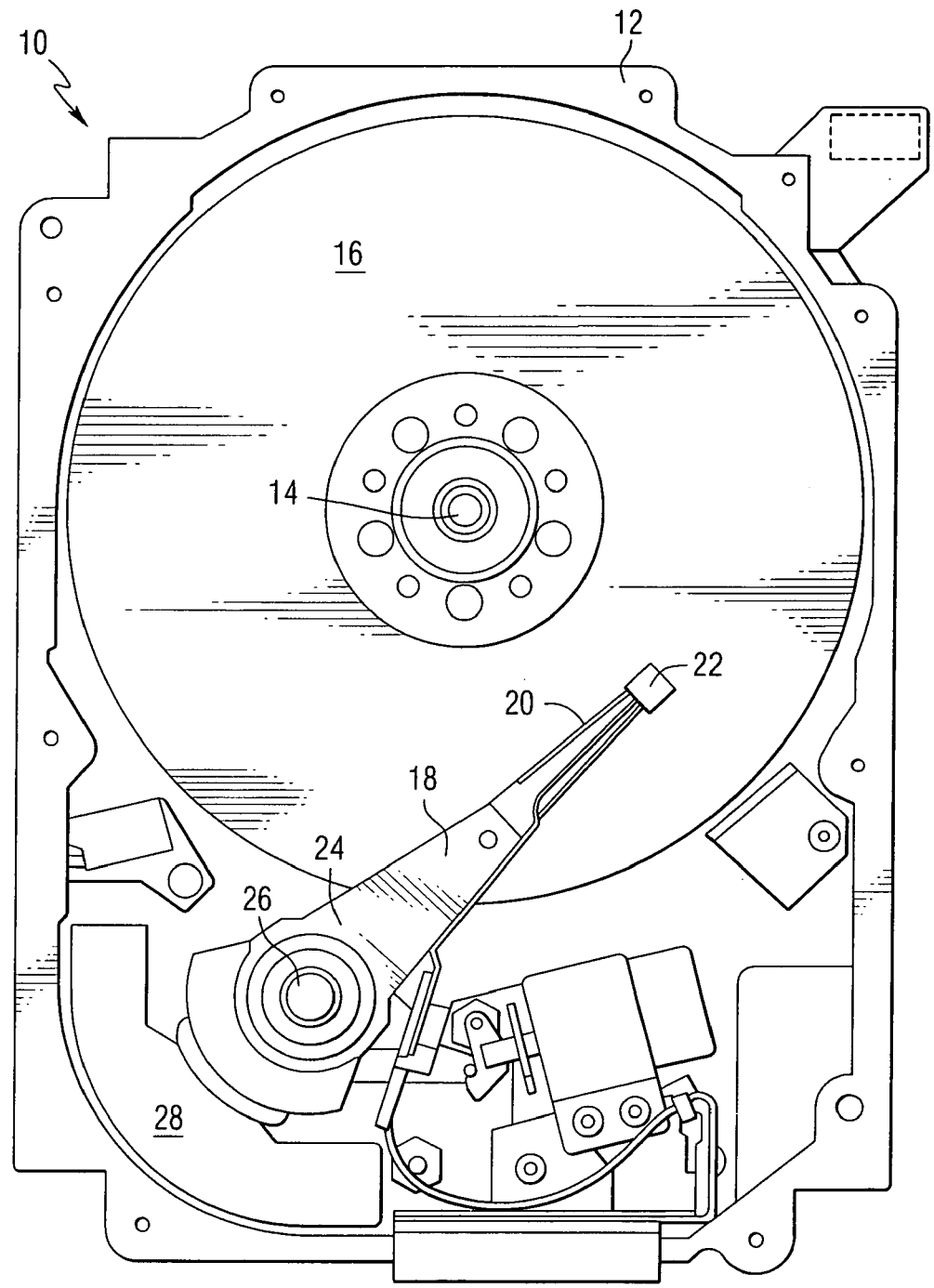
FIG. 1 is a pictorial representation of a magnetic disc drive that can include magnetic heads constructed in accordance with this invention.

Referring to the drawings, FIG. 1 is a pictorial representation of a disc drive 10 that can utilize magnetic recording heads, or other type recording heads such as magneto-optical or thermal/heat assisted recording heads constructed in accordance with this invention. The disc drive includes a housing 12 (with the upper portion removed and the lower portion visible in this view) sized and configured to contain the various components of the disc drive. The disc drive includes a spindle motor 14 for rotating at least one data storage medium 16 within the housing, in this case a magnetic disc. At least one arm 18 is contained within the housing 12, with each arm 18 having a first end 20 with a recording and/or reading head or slider 22, and a second end 24 pivotally mounted on a shaft by a bearing 26. An actuator motor 28 is located at the arm's second end 24, for pivoting the arm 18 to position the head 22 over a desired sector of the disc 16. The actuator motor 28 is regulated by a controller that is not shown in this view and is well-known in the art.

Figure 2:
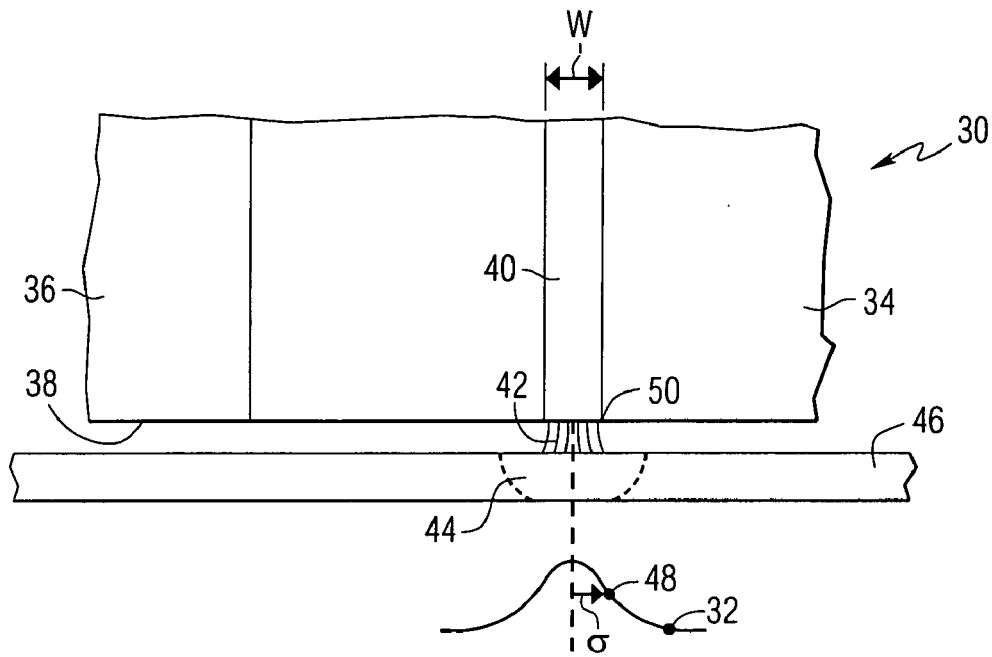
FIG. 2 is a schematic representation of a portion of a magnetic recording head with a graph of a thermal profile produced by the recording head.

FIG. 2 is a schematic representation of a portion of a ring type magnetic recording head 30 with a graph of a thermal profile 32 produced in a storage medium by the recording head. The recording head includes a write pole 34 and a return pole 36, each having an end positioned adjacent to an air bearing surface 38. A transducer in the form of a metallic pin 40 is positioned between the write pole and the return pole. The transducer is used to produce near field radiation illustrated by lines 42, that is used to heat a portion 44 of a magnetic storage medium 46. Curve 32 represents a thermal profile of the heated portion of the storage medium. In the example of FIG. 2, the pin is shown to have a width W, of for example 24 nm, and the peak temperature occurs under the center of the pin. Point 48 is located at the sharpest thermal gradient of the thermal profile and in this example is a distance σ of 16 nm from the center of the pin. The write pole corner 50 is located 12 nm from the center of the pin. While a metallic pin is shown in the example of FIG. 2 and in subsequent examples as the near field transducer, it should be understood that the invention is not limited to metallic pin transducers. For example, a ridge waveguide can also be used as the near field transducer.

Figure 3:
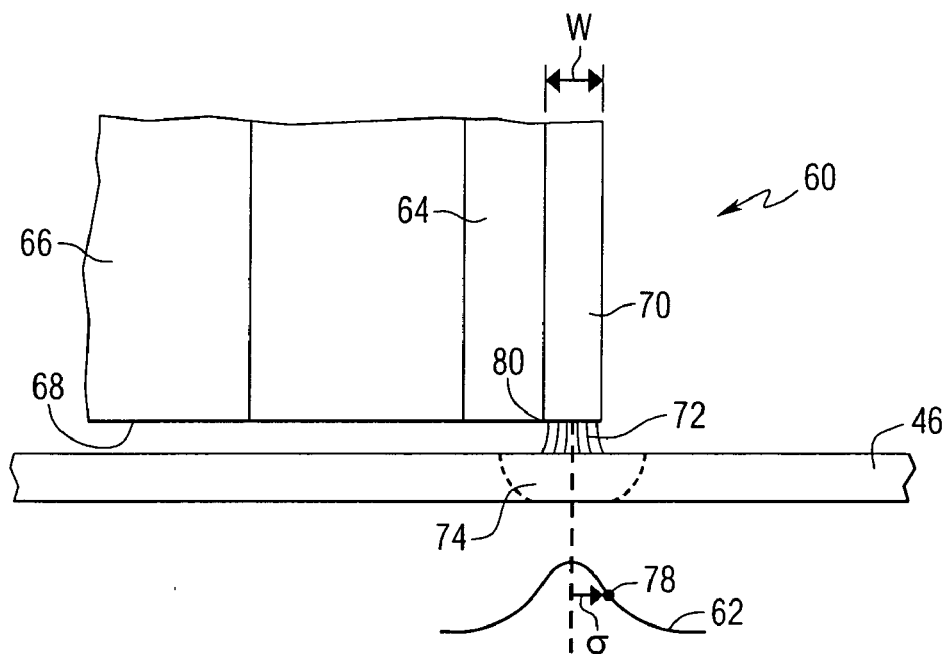
FIG. 3 is a schematic representation of a portion of a magnetic recording head with graphs of the magnetic field produced by the recording head and the coercivity of the storage medium.

FIG. 3 is a schematic representation of a portion of a perpendicular type magnetic recording head 60 with a graph of a thermal profile 62 produced by the recording head. The recording head includes a write pole 64 and a return pole 66, each having an end positioned adjacent to an air bearing surface 68. A transducer in the form of a metallic pin 70 is positioned adjacent to the write pole. The transducer is used to produce near field radiation illustrated by lines 72, that is used to heat a portion 74 of a magnetic storage medium 76. Curve 62 represents a thermal profile of the heated portion of the storage medium. In the example of FIG. 3, the pin is shown to have a width W, of for example 24 nm, and the peak temperature occurs under the center of the pin. Point 78 is located at the sharpest thermal gradient of the thermal profile and in this example is a distance σ of 16 nm from the center of the pin. The write pole corner 80 is located 12 nm from the center of the pin.

Modeling has shown that the spot size for the electromagnetic pin scales almost linearly with the diameter of the pin. In the examples of FIGS. 2 and 3, the thermal profile has a full width, half maximum (FWHM) of approximately 37 nm that can be produced by a pin having a diameter of 24 nm. The sharpest thermal gradient occurs at the first sigma of a Gaussian thermal profile. For a 24 nm pin with a 37 nm FWHM, the sharpest thermal gradients occur at about 16 nm to the left and right of the pin. This is shown schematically in FIG. 2, which shows a longitudinal ring head with the pin in the gap, and FIG. 3, which shows a perpendicular pole writer with the pin fabricated on top of the pole. For the perpendicular case the location of the sharpest thermal gradient occurs 28 nm (16 nm+12 nm) to the right of the pole. For the longitudinal ring head case the sharpest thermal gradient occurs 4 nm (16 nm–12 nm) to the right of the pole corner. While a Gaussian thermal profile has been assumed for these examples, other thermal profiles may be produced.

Figure 4:
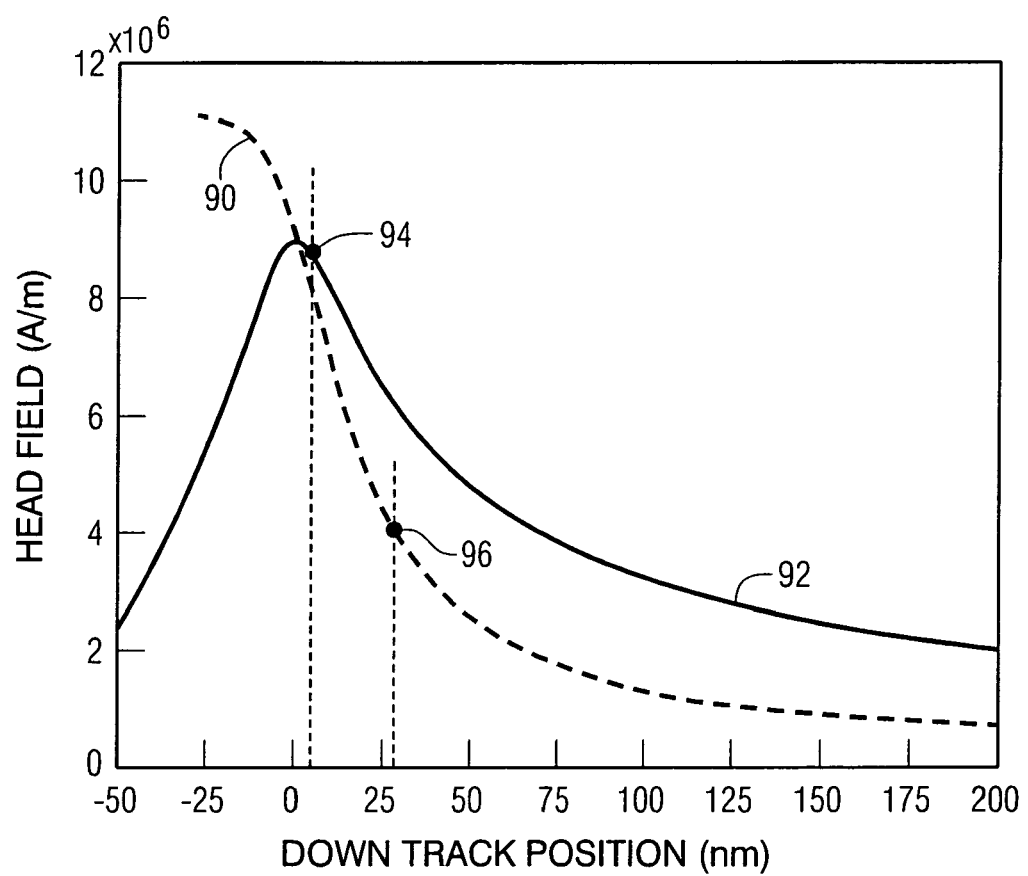
FIG. 4 is a graph showing head field versus down track position for perpendicular and longitudinal heads.

Assuming the medium has a perpendicular orientation, FIG. 4 shows the relative size of the magnetic fields from the heads of FIGS. 2 and 3. Curve 90 represents the perpendicular head field and curve 92 represents the longitudinal head field. In FIG. 4 the pole corners are placed at x=0 for both heads. Therefore with proper optimization of the system, the transition will occur at x=4 nm for the longitudinal ring head, as illustrated by point 94, and at x=28 nm for the perpendicular head, as illustrated by point 96. Note that the perpendicular component of the magnetic field of the ring head of FIG. 2 is used to obtain the data of FIG. 4. For the perpendicular head field a Westmijze head field was used, and for the longitudinal head field a Karlqvist head field was used. Assuming that the thermal gradients dominate and the head field gradients are irrelevant, it is apparent that by using the longitudinal ring head considerably more field can be obtained at the location of the transition of magnetization of the storage medium. In FIG. 4, the magnitude of the field is based on an example where the gap sizes are equal. The actual field will depend on the gap width of the magnetic heads, for example, increasing the gap lowers the field.

Figure 5:
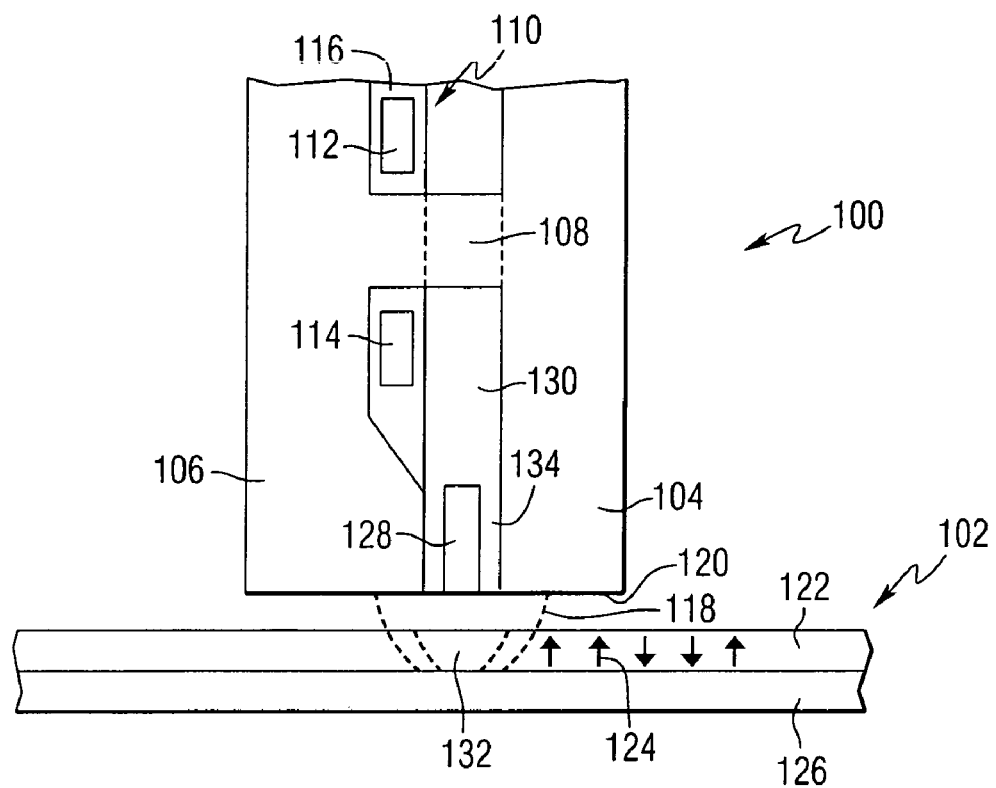
FIG. 5 is a cross-sectional view of a perpendicular magnetic recording head constructed in accordance with this invention, and a portion of an associated perpendicular magnetic storage medium

FIG. 5 is a cross-sectional view of a portion of a magnetic recording head 100 constructed in accordance with this invention, and a portion of an associated perpendicular magnetic storage medium 102. The magnetic recording head 100 includes a write pole 104 and a return pole 106 coupled by a pedestal 108. A coil 110 comprising conductors 112 and 114 encircles the pedestal and is supported by an insulator 116. A current in the coil induces a magnetic field in the pedestal and the poles. Magnetic flux 118 exits the recording head at the air bearing surface 120 and is used to change the magnetization of portions of a magnetically hard layer 122 of the storage medium 102, as illustrated by arrows 124. An electric field transducer 128, in the form of a metallic pin, is positioned between the write pole and the return pole. The storage medium can include a substrate 126, but when a ring type recording head is used, the storage medium does not need to include a soft underlayer as found in other perpendicular recording media. The transducer is coupled to a waveguide 130 that receives an electromagnetic wave from an external source such as a laser. An electric field at the end of the transducer is used to heat a portion 132 of the storage medium to lower the storage medium coercivity so that the magnetic field from the write pole can affect the magnetization of the storage medium. The transducer is electrically isolated from the poles, for example by an insulating layer 134. The insulating layer can be formed by a portion of the waveguide or a separate layer, and can be made of, for example $Al_2O_3$. The composition and thickness of the insulating layer should be selected for optimum performance. The selected thickness will be a function of the pin shape and material composition, as well as the operational wavelength.

For a perpendicular recording head constructed in accordance with the invention, a storage medium having a soft underlayer may be used. In addition, in heat assisted magnetic recording media, a heat sink layer may be used to remove heat from the magnetic layer.

Figure 6:
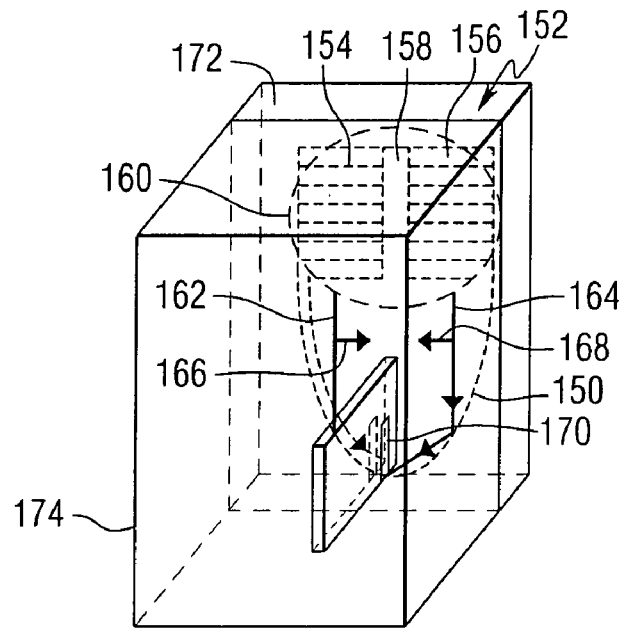
FIG. 6 is an isometric view of the perpendicular magnetic recording head of FIG. 5.

FIG. 6 is an isometric view of the perpendicular magnetic recording head of FIG. 5. The magnetic recording head 100 includes the components shown in FIG. 5 wherein the waveguide is a parabolic mirror 150 having a transducer embedded adjacent to an end near the air bearing surface of the recording head. The waveguide includes a dual input grating coupler 152 that is comprised of gratings 154 and 156 separated by a gap 158. A laser beam illustrated by dotted circle 160 is directed onto the gratings and coupled to the waveguide by the gratings to produce electromagnetic waves within the waveguide as illustrated by arrows 162 and 164. The gratings are configured such that the wave illustrated by arrow 164 is phase shifted by 180° with respect to the wave illustrated by arrow 162. Arrows 166 and 168 illustrate the instantaneous electric field of the waves. The waves are reflected off of the parabolic sides of the waveguide and the electric field components of the reflected waves add in the vertical direction at the transducer so that the transducer 170 concentrates the electromagnetic waves near the air bearing surface of the recording head to heat a portion of the magnetic storage medium. The waveguide is shown to be embedded in a cladding layer 172 and mounted on a slider 174.

Figure 7:
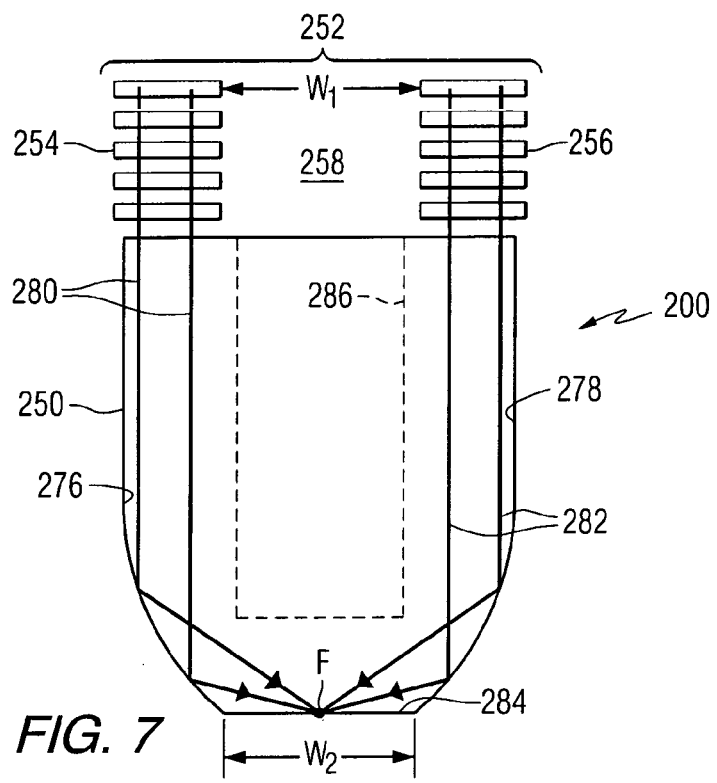
FIG. 7 is a schematic illustration of a waveguide constructed in accordance with the invention.
Figure 8:
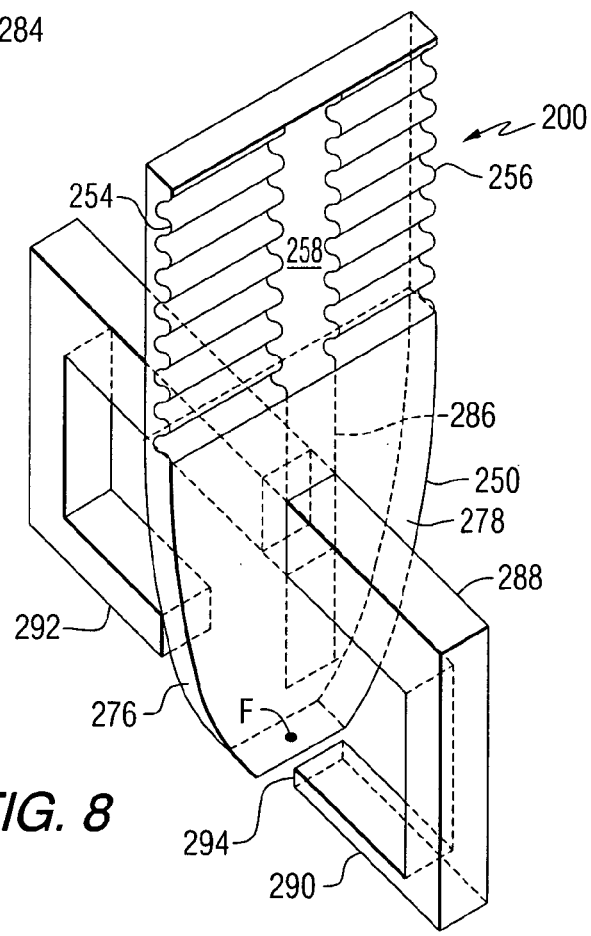
FIG. 8 is an isometric view of the waveguide illustrated in FIG. 7 combined with a magnetic recording pole arrangement.

Referring to FIGS. 7 and 8, there is illustrated an additional embodiment of the invention and, particularly, an embodiment pertaining to the dual input grating coupler concept illustrated in FIG. 6. Specifically, FIG. 7 is a schematic representation of a two-dimensional planar waveguide 200 in the form of a solid immersion mirror 250. The waveguide 200 includes edges 276, 278 having a substantially parabolic shape. Due to differences in refractive index between the waveguide 200 and an adjacent material (not shown), an electromagnetic wave traveling in the axial direction through the waveguide 200, as illustrated by arrows 280 and 282, would be reflected by the waveguide 200 to a focal point F of the waveguide 200. A dual input grating coupler 252 that is comprised of gratings 254 and 256 separated by a gap 258 can be used to couple the electromagnetic waves 280 and 282 into the planar waveguide 200. These electromagnetic waves 280 and 282 are then reflected by the edges 276, 278, respectively, for their intended use.

By constructing the dual input grating coupler 252 to have a gap 258 formed between the gratings 254 and 256, a "dead zone" or "dead spot", generally designated by dashed line 286, is formed in the waveguide 200. Thus, no electromagnetic waves or light is launched into the waveguide 200 in the area of the dead zone 286.

One advantage of the dual input grating coupler 252 is that undesirable electromagnetic waves or light can be prevented from being launched into the planar waveguide 200. For example, the planar waveguide 200 illustrated in FIG. 7 includes a truncated end 284 adjacent the focal point F so as to more efficiently transmit energy to an adjacent recording medium. Electromagnetic waves that would normally be launched into the planar waveguide 200, but for the gap 258 formed between the gratings 254 and 256, would pass through the dead zone 286 toward the truncated end 284 without being reflected by the edges 276 and 278 of the solid immersion mirror 250. These undesirable electromagnetic waves would otherwise reach the truncated end 284 of the waveguide 200 in a semi-planar wavefront that may interfere with the focused beam at the focal point F in an undesirable manner. These undesirable electromagnetic waves would pass directly through the truncated end 284 and deliver undesirable energy to the recording medium that would interfere with the recording process.

In one embodiment, the width of the gap 258 $W_1$ may be substantially equal to a width $W_2$ of the truncated end 284 of the waveguide 200 so as to prevent the undesired coupling of unwanted electromagnetic waves into the waveguide 200, as described herein.

Referring to FIG. 8, an additional advantage of utilizing the dual input grating coupler 252 for creation of the dead zone 286 is illustrated. Specifically, FIG. 8 illustrates that additional components of a data storage device, such as a yoke portion 288 which connects recording poles 290 and 292, may pass through the waveguide 200 without affecting or interfering with the operation of the waveguide 200, i.e., without affecting or interfering with the coupling of electromagnetic waves 280 and 282 (see FIG. 7) into the waveguide 200 for reflecting the electromagnetic waves as described herein and heating the recording medium by creation of an optical spot of energy. As can be appreciated from FIG. 8, the described configuration allows for closely positioning an end 294 of the recording pole 290 adjacent to the focal point F of the waveguide 200 which is desirable for efficient magneto optical or thermal/heat assisted recording processes. It will be appreciated that the waveguide 200 with the dead zone 286 may be used in a similar manner with other devices and components besides just data storage devices or components.

Figure 9:
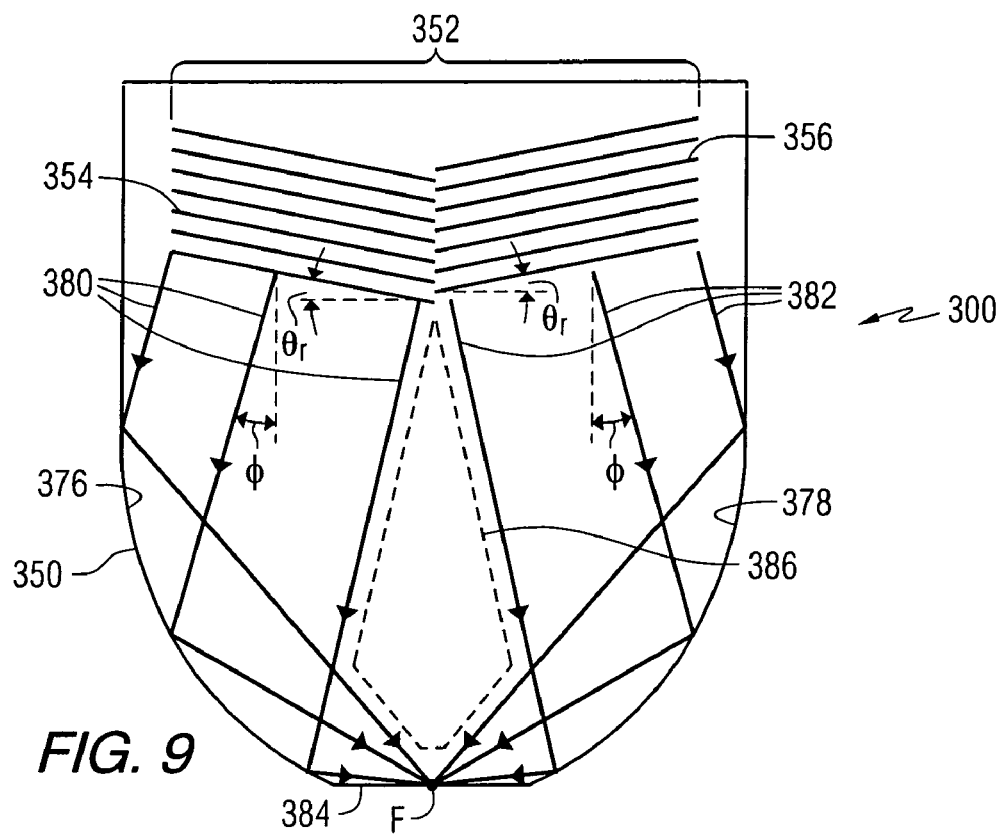
FIG. 9 is a schematic illustration of another embodiment of a waveguide in accordance with the invention.

Referring to FIG. 9, there is illustrated an additional embodiment of a planar waveguide 300 constructed in accordance with the invention. Specifically, FIG. 9 is a schematic representation of the waveguide 300 in the form of a solid immersion mirror 350. The waveguide 300 includes edges 376, 378 which may have a substantially parabolic shape. Due to differences in refractive index between the waveguide 300 and an adjacent material (not shown), electromagnetic waves 380 and 382 would be reflected by the sides 376, 378 of the waveguide 300 to a focal point F of the waveguide 300. To couple the electromagnetic waves 380, 382 into the waveguide 300, the waveguide 300 includes a dual input grating coupler 352 that is comprised of gratings 354 and 356 that are tilted or slanted relative to one another. Either one of the gratings 354 or 356 or both of the gratings 354 and 356 may be slanted at a grating angle $\theta_r$ for launching the electromagnetic waves 380 and 382 into the waveguide 300 at an angle φ, as illustrated in FIG. 9. In addition, it will be appreciated that the gratings 354 and 356 may be slanted at different grating angles relative to one another in accordance with the invention The grating angle $\theta_r$ for the grating 354 may be in the range of about zero (0) degrees to about twenty (20) degrees. Similarly, the grating $\theta_r$ for the grating 356 may be in the range of about zero (0) degrees to about twenty (20) degrees. The angle φ for the waves 380 and 382 maybe in the range of about zero (0) degrees to about twenty (20) degrees. It will be appreciated that one of the gratings 354 or 356 may be positioned generally horizontal, i.e., $\theta_r=0°$ with the other grating being slanted relative thereto.

Similar to the embodiment illustrated in FIGS. 7 and 8, the described configuration for waveguide 300 results in the formation of a "dead zone" or "dead spot", generally designated by dashed line 386. As previously described herein, the dead zone 386 allows for additional components of a data storage device, or other device that may incorporate the waveguide 300, to pass through the waveguide 300 without affecting or interfering with the operation of the waveguide 300.

Still referring to FIG. 9, an additional advantage of the waveguide 300 having the gratings 354 and 356 being slanted relative to one another is that substantially all of the electromagnetic waves that are directed to the waveguide 300 across the width of the dual input grating coupler 352 are coupled into the waveguide 300. This includes the electromagnetic waves that enter the waveguide 300 adjacent to the center thereof where grating 354 meets grating 356.

Figure 10:
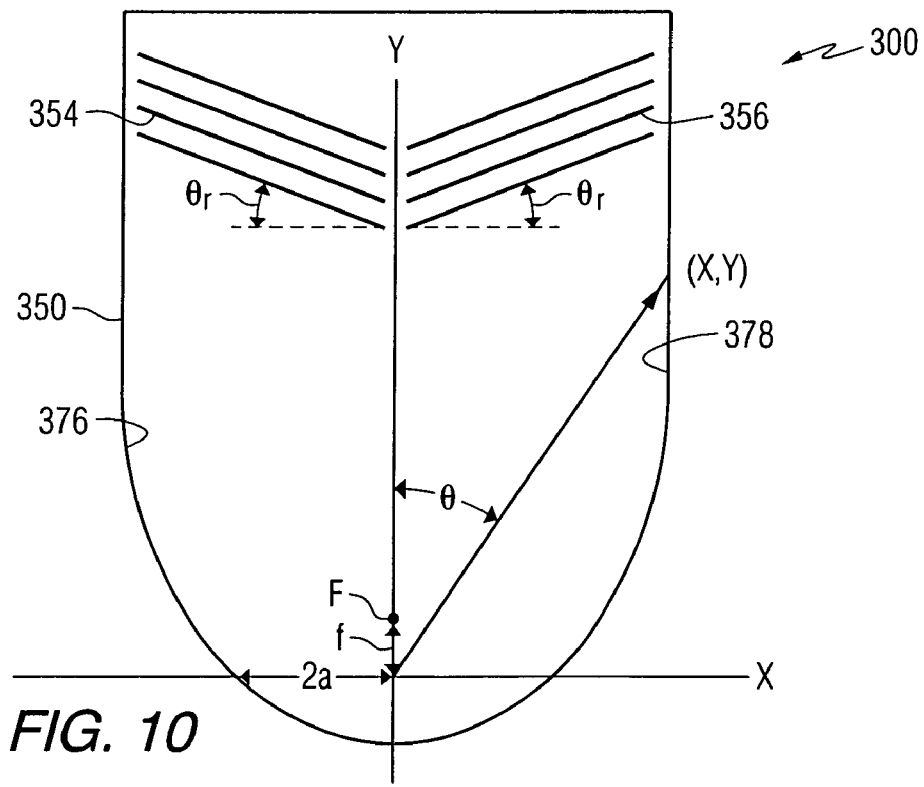
FIG. 10 is an additional schematic representation of the waveguide illustrated in FIG. 9.

FIG. 10 illustrates the waveguide 300 for purposes of determining the shape of the solid immersion mirror 350 in relation to the slanted gratings 354 and 356. It will be appreciated that the side 376 of the solid immersion mirror 350 is shaped in relation to the grating angle $\theta_r$ of grating 354 and that the shape of the side 378 is formed in relation to the grating angle $\theta_r$ for the grating 356. Specifically, the shape of the sides 376 and 378 for the solid immersion mirror 350 may be determined by the following equations:

$$x = \frac{2\left(a-\frac{m\lambda}{2}\right)\cos(\theta+\theta_r) + 2\{SQ.RT.\}\left[\left(a-\frac{m\lambda}{2}\right)^2 + f\left(a-\frac{m\lambda}{2}\right)\sin^2(\theta+\theta_r)\right]\{END\ SQ.RT.\}}{\sin^2(\theta+\theta_r)} \cos\theta,\ 0 \le \theta \le \frac{\pi}{2}$$

$$y = \frac{2\left(a-\frac{m\lambda}{2}\right)\cos(\theta+\theta_r) + 2\{SQ.RT.\}\left[\left(a-\frac{m\lambda}{2}\right)^2 + f\left(a-\frac{m\lambda}{2}\right)\sin^2(\theta+\theta_r)\right]\{END\ SQ.RT.\}}{\sin^2(\theta+\theta_r)} \sin\theta,\ 0 \le \theta \le \frac{\pi}{2}$$

$$x = \frac{2\left(a-\frac{m\lambda}{2}\right)\cos(\theta-\theta_r) + 2\{SQ.RT.\}\left[\left(a-\frac{m\lambda}{2}\right)^2 + f\left(a-\frac{m\lambda}{2}\right)\sin^2(\theta-\theta_r)\right]\{END\ SQ.RT.\}}{\sin^2(\theta-\theta_r)} \cos\theta,\ \frac{3\pi}{2} \le \theta \le 2\pi$$

$$y = \frac{2\left(a-\frac{m\lambda}{2}\right)\cos(\theta-\theta_r) + 2\{SQ.RT.\}\left[\left(a-\frac{m\lambda}{2}\right)^2 + f\left(a-\frac{m\lambda}{2}\right)\sin^2(\theta-\theta_r)\right]\{END\ SQ.RT.\}}{\sin^2(\theta-\theta_r)} \sin\theta,\ \frac{3\pi}{2} \le \theta \le 2\pi$$

wherein:
f=focal point distance from origin
a=scale factor
$\theta$=angle as shown in FIG. 10
$\theta_r$=Grating Angle
m=scale factor
$\lambda$=wavelength
(x,y)– points on the solid immersion mirror 350.

The recording heads of this invention can incorporate various waveguides, such as those illustrated in U.S. Pat. No. 6,795,630, to generate focused beams by means of mode index lenses or planar solid immersion mirrors. The waveguide in the recording head of FIG. 6 is a two-dimensional waveguide in the form of a solid immersion mirror, including a metal pin embedded in an end of the waveguide. The tip of the pin can extend beyond the waveguide. The waveguide includes edges in this example having a substantially parabolic shape. While FIG. 6 shows a specific example, it should be understood that other waveguides that utilize other type of polarization can also be used.

Due to differences in refractive index between the waveguide and the adjacent material, an electromagnetic wave traveling in the axial direction through the waveguide would be reflected by the waveguide onto the surface of the metal pin. If the electric field at the focal point is parallel to the axis of the pin, then it can couple to the pin and generate surface plasmons along the surface of the pin. Near field radiation then emanates from the tip of the pin. The metal pin placed at the focus concentrates the light to a much smaller spot than would be possible with a mode index lens or SIM alone. The waveguide can be truncated at the end adjacent to the pin so that most of the incoming electromagnetic wave strikes the edges of the waveguide at an angle less than some predetermined angle, such as 45°. For a linearly polarized collimated electromagnetic wave, edges having a parabolic shape will focus the wave to a focal point. However, it should be understood that other edge shapes can be used if the incoming wave is conditioned such that the combination of the wave characteristics and the edge shape result in the desired focusing of the wave at the pin. The pin can have a rectangular cross-section and can be tapered to a point. However, pins having other cross-sectional shapes can also be used.

As discussed in U.S. Pat. No. 6,795,630, the waveguide can be made of, for example, a high index dielectric core material like $TiO_2$, $Ta_2O_5$, Si, SiN, or ZnS depending on the wavelength and refractive index desired. For example, Si has a very large index of 3.5 at a wavelength of 1550 nm in the near infrared, but it is not transparent to visible light. $Ta_2O_5$ has a lower index of about 2.1, but is transparent throughout the near infrared and visible. The waveguide also contains dielectric cladding layers on either side of the core. The cladding layer must have a lower refractive index than the core layer. Preferably the difference in refractive index between the core and cladding should be as large as possible. Air is a suitable dielectric for one side of the cladding. Other dielectrics that could be used as cladding layers include $SiO_2$ with an index of 1.5 and $Al_2O_3$ with an index of about 1.8.

When the invention is used with either a transverse electric (TE) or transverse magnetic (TM) mode electromagnetic wave, means can be provided to phase shift a portion of the electromagnetic wave. This phase shift can be achieved by providing a means for launching the two-dimensional analog of a radially polarized wave into the planar waveguide. This is called a split linear polarization waveguide mode. Two methods are described in U.S. Pat. No. 6,795,630 for achieving the split linear polarization. The first technique modifies half of the planar waveguide by changing the refractive index of the core or cladding dielectrics and/or the thickness of the core or cladding dielectrics in the waveguide in one section. An alternative technique for generating a radially polarized planar waveguide mode makes use of a diffraction grating to launch the planar mode. Diffraction gratings are commonly used to inject light into a planar waveguide. To generate radial polarization the two diffraction gratings are used with a longitudinal offset between them. The purpose of the dual grating is to introduce a relative 180° phase shift between the two halves of the beam.

In the center of the SIM is a "dead spot" where no light is launched into the waveguide. The ring head is fabricated within this gap so a split back head is not required (although the design will work with one). The functionality of the pin and the waveguide is identical to what has been described in U.S. Pat. No. 6,795,630. However, this invention uses the perpendicular field components from a ring head. It is important to point out that there are a number of variations on the pin design. For example it has been shown that surrounding the pin in a dielectric or having the pin protrude out from the SIM enhances the effects. All of these additional modifications are compatible with this design. It should be noted that this invention is not limited to perpendicular writers or writers in disc drives. For example, in principle the advantages of heat assisted magnetic recording can be used to extend the areal densities of longitudinal and tilted media recording schemes where the anisotropy of the medium may not be perpendicular to the plane of the film. In these instances, the in-plane field component of the magnetic head field would be used instead of the perpendicular component to orient the medium after it has been heated to reduce the coercivity. Specifically for longitudinal media the in-plane field component is largest directly beneath the center of the gap. In this instance, it would be beneficial to have the pin positioned so that the sharpest thermal gradient occurs at this location.

There are a number of advantages to using a ring head. The most important is the elimination of the need for a soft underlayer in the medium, thereby simplifying the medium development process. This simplifies the design of a medium that meets the strict HAMR requirements such as optimizing the coupling from the near field transducer and controlling the thermal properties within the medium. In addition, by not using a soft underlayer, the soft underlayer noise is eliminated.

To get the sharpest possible transition it is desirable to maximize the field gradient with the thermal gradient, regardless of whether or not the medium is granular or continuous. This places some constraints on the location of the pole relative to the near field transducer. The demagnetization field will always oppose the head field and hence acts to broaden the transition. The thermal gradients aid in the transition formation effectively giving a sharper transition.

Since the medium is spinning, the peak of the thermal profile may not line up with the peak of the incident optical beam. This is known as preheating and is well understood in optical recording. In addition, since the near field transducer will be close to the write pole, the pole may distort the electromagnetic field profile in the transducer leading to a change in the incident optical profile. However, for the purposes of this description, it is assumed that the thermal profile is centered immediately below the transducer and that the distortion of the optical spin due to the pole is minimal.

In addition to the recording heads and disc drive described above, this invention also provides a method of magnetic recording comprising: positioning an air bearing surface of a magnetic recording head adjacent to a magnetic storage medium, wherein the recording head includes a write pole having a pole tip adjacent to an air bearing surface, a return pole, a near field transducer positioned adjacent to the air bearing surface, and means for coupling an electromagnetic wave to the near field transducer; using near field radiation produced at the metallic pin to heat a portion of the magnetic storage medium between the write pole and the return pole; and using a magnetic field produced by the write pole to affect the magnetization of the portion of the magnetic storage medium. The thermal profile produced in the magnetic storage medium by the near field radiation can have a maximum gradient below an edge of the write pole.

While the present invention has been described in terms of several examples, it will be apparent to those skilled in the art that various changes can be made to the disclosed examples without departing from the scope of the invention as defined by the following claims.

What is claimed is:

1. An apparatus, comprising:
   a solid immersion mirror planar waveguide; and
   first and second diffraction gratings for directing first and second electromagnetic waves into the solid immersion mirror planar waveguide;
   wherein the first diffraction grating and the second diffraction grating are spaced apart to form a gap therebetween.

2. The apparatus of claim 1, wherein the solid immersion mirror planar waveguide includes a truncated end and the width of the gap is substantially equal to the width of the truncated end.

3. The apparatus of claim 1, wherein the first diffraction grating and the second diffraction grating are slanted relative to each other.

4. The apparatus of claim 1, wherein the planar waveguide includes a first edge and a second edge, the first and second edges being shaped for directing the electromagnetic waves to a predetermined point.

5. The apparatus of claim 4, wherein the first and second edges form a substantially parabolic shape.

6. The apparatus of claim 4, wherein the first and second edges are structured and arranged as a function of an angle of at least one of the first diffraction grating and the second diffraction grating.

7. The apparatus of claim 1, wherein the first diffraction grating is positioned at a grating angle in the range of about zero degrees to about twenty degrees.

8. The apparatus of claim 7, wherein the second diffraction grating is positioned at a grating angle in the range of about zero degrees to about twenty degrees.

9. The apparatus of claim 1, wherein the first diffraction grating and the second diffraction grating direct the first electromagnetic wave and the second electromagnetic wave around a dead zone area of the planar waveguide.

10. An apparatus comprising:
    a solid immersion mirror planar waveguide; and
    first and second diffraction gratings for directing first and second electromagnetic waves into the solid immersion mirror planar waveguide;
    wherein the first diffraction grating and the second diffraction grating are slanted relative to each other.

11. The apparatus of claim 10, wherein the solid immersion mirror planar waveguide includes a first and a second edge, the first and second edges being shaped for directing the electromagnetic waves to a predetermined point.

12. The apparatus of claim 11, wherein the first and second edges form a substantially parabolic shape.

13. The apparatus of claim 11, wherein the first and second edges form a shape that is a function of an angle of at least one of the first and second diffraction gratings.

14. The apparatus of claim 10, wherein the first diffraction grating is positioned at a grating angle in the range of about zero degrees to about twenty degrees.

15. The apparatus of claim 14, wherein the second diffraction grating is positioned at a grating angle in the range of about zero degrees to about twenty degrees.

16. The apparatus of claim 10, wherein the first diffraction grating and the second diffraction grating direct the electromagnetic waves around a dead zone area of the planar waveguide.

* * * * *

UNITED STATES PATENT AND TRADEMARK OFFICE
CERTIFICATE OF CORRECTION

PATENT NO. : 7,266,268 B2 Page 1 of 1
APPLICATION NO. : 11/032277
DATED : September 4, 2007
INVENTOR(S) : William A. Challener et al.

It is certified that error appears in the above-identified patent and that said Letters Patent is hereby corrected as shown below:

Background of the Invention
Column 1, Line 28
"a real" should read -- areal --

Column 1, Line 39
"a real" should read -- areal --

Column 2, Line 53
"a real" should read -- areal --

Column 2, Lines 55 and 56
"a real" should read -- areal --

Detailed Description of the Invention
Column 10, Line 63
"a real" should read -- areal --

Signed and Sealed this

First Day of April, 2008

JON W. DUDAS
*Director of the United States Patent and Trademark Office*